United States Patent Office 3,836,578
Patented Sept. 17, 1974

3,836,578
PROSTANOIC ACID DERIVATIVES
Bengt Samuelsson, Kemiska Institutionen, Karolinska Institutet, Stockholm 60, Sweden
No Drawing. Continuation-in-part of abandoned application Ser. No. 514,405, Dec. 16, 1965. This application Apr. 4, 1967, Ser. No. 628,285
Int. Cl. C07c 61/36, 69/74
U.S. Cl. 260—514 D          23 Claims

ABSTRACT OF THE DISCLOSURE

This invention is a class of new and useful prostanoic acid derivatives and processes for preparing them. These new compounds are similar in structure to certain of the known prostaglandins but differ in that each has a carbonyl group rather than a hydroxy group at the C-15 position of prostanoic acid. Some of these new compounds also differ in having a double bond between $C_5$ and $C_6$ but not between $C_{13}$ and $C_{14}$. These new prostanoic acid derivatives have biological properties which cause them to be useful variously in the treatment of hypertension, hypotension, and conditions involving abnormal lipid mobilization.

CROSS REFERENCE TO RELATED APPLICATION

This application is a continuation-in-part of copending application Ser. No. 514,405, filed Dec. 16, 1965, now abandoned.

DETAILED DESCRIPTION

This invention relates to novel compositions of matter and to methods for producing them. In particular, this invention relates to certain novel derivatives of prostanoic acid:

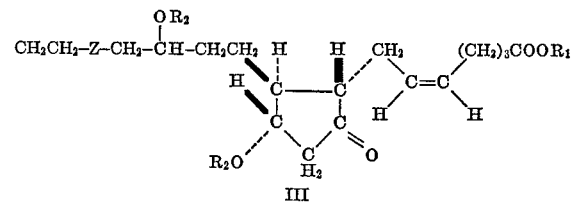

The hydrogen atoms attached to C-8 and C-12 in formula I are in trans configuration. See Bergström et al., J. Biol. Chem., 238, 3555 (1963) and Horton, Experientia, 21, 113 (1965).

The novel compounds of this invention include compounds of the following formula, especially in essentially pure form:

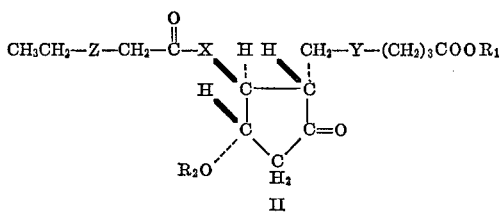

wherein X is —$CH_2CH_2$— or trans-CH=CH— and both Y and Z are —$CH_2CH_2$—, or wherein X is —$CH_2CH_2$—, Y is cis-CH=CH—, and Z is —$CH_2CH_2$— or cis-CH= CH—, wherein $R_1$ is hydrogen, hydrocarbyl, or a pharmacologically acceptable cation, and wherein $R_2$ is hydrogen or carboxyacyl.

The novel compounds of this invention also include compounds of the following formula, especially in essentially pure form:

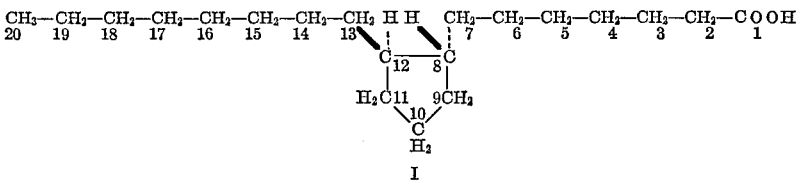

wherein Z is —$CH_2CH_2$— or cis-CH=CH—, wherein $R_1$ is hydrogen, hydrocarbyl, or a pharmacologically acceptable cation, and wherein $R_2$ is hydrogen or carboxyacyl.

The novel compounds of this invention also include compounds of the following formula, especially in essentially pure form:

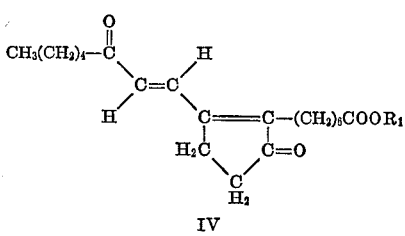

wherein $R_1$ is hydrogen, hydrocarbyl, or a pharacologically acceptable cation.

In compounds of formulas II and III, the $R_2O$— substituent, as above defined, is in alpha ($\alpha$) configuration.

Preferably, the hydrocarbyl moiety in compounds of formulas II, III, and IV contains one to about 10 carbon atoms. Among the hydrocarbyl moieties, lower alkyl is especially preferred. Preferably, the carboxyacyl moiety in compounds of formulas II, III, and IV contains one to about 12 carbon atoms. Among the carboxyacyl moieties, lower alkanoyl is especially preferred.

Examples of lower alkyl, i.e., with one to about 8 carbon atoms, are methyl, ethyl, propyl, butyl, pentyl, hexyl, heptyl, octyl, and isomeric forms thereof. Examples of other hydrocarbyl moieties within the scope of this invention are nonyl, undecyl, allyl, crotyl, 3-butenyl, 5-hexenyl, propargyl, 4-pentynyl, cyclopentyl, 4-tert-butylcyclohexyl, cyclooctyl, benzyl, 2-naphthylmethyl, and the like.

Examples of lower alkanoyl, i.e., with one to about 8 carbon atoms, are formyl, acetyl, propionyl, butyryl, valeryl, hexanoyl, heptanoyl, octanoyl, and isomeric forms thereof. Examples of other carboxyacyl moieties within the scope of this invention are decanoyl, crotonyl, cyclohexanecarbonyl, 3-cyclohexenecarbonyl, phenylacetyl, p-chlorophenoxyacetyl, succinyl, benzoyl, p-nitrobenzoyl, naphthoyl, furoyl, 3-pyridinecarbonyl, phthaloyl, and the like.

Pharmacologically acceptable cations within the scope of $R_1$ in formulas II, III, and IV can be the cationic form of a metal, ammonia, or an amine, or can be quaternary ammonium ions. Especially preferred metal cations are those derived from the alkali metals, e.g., lithium, sodium, and potassium, and from the alkaline earth metals, e.g., magnesium, calcium, strontium, and barium, although the cationic form of other metals, e.g., aluminum, zinc, iron, and silver, are within the scope of this invention.

Pharmacologically acceptable amine cations within the scope of $R_1$ in formulas II, III, and IV can be derived from primary, secondary, or tertiary amines. Examples of suitable amines are methylamine, dimethylamine, trimethylamine, ethylamine, dibutylamine, triisopropylamine, N-methylhexylamine, decylamine, allylamine, crotylamine, cyclopentylamine, dicyclohexylamine, benzylamine, dibenzylamine, α-phenylethylamine, β-pheylethylamine, ethylenediamine, diethylenetriamine, and like lower-aliphatic, lower-cycloaliphatic, and lower-araliphatic amines containing up to and including about 18 carbon atoms, as well as heterocyclic amines such as piperidine, morpholine, pyrrolidine, piperazine, and lower-alkyl derivatives thereof, such as 1 methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups such as mono-, di-, and triethanolamine, ethyldiethanolamine, N-butylethanolamine, 2-amino-1-butanol, 2-amino-2-ethyl-1,3-propanediol, 2-amino-2-methyl-1-propanol, tris(hydroxymethyl)aminomethane, N-phenylethanolamine, N-(p-tert-amylphenyl)diethanolamine, galact-amine, N - methylglucamine, N - methylglucosamine, ephedrine, phenylephrine, epinephrine, procaine, and the like.

Examples of suitable pharmacologically acceptable quaternary ammonium cations within the scope of $R_1$ in formulas II, III, and IV are tetramethylammonium, tetraethylammonium, benzyltrimethylammonium, phenyltriethylammonium, and the like.

It is known that certain prostanoic acid derivatives, notably the prostaglandins, e.g., $PGE_1$, $PGE_2$, and $PGE_3$, are extremely potent in lowering systemic arterial blood pressure in animals, including man, when injected intravenously. The prostaglandins also have a strong stimulatory action on smooth animal muscle, and they antagonize epinephrine-induced mobilization of free fatty acids.

It was quite surprising that the novel prostanoic acid derivatives of formula II have only slight activity in lowering systemic animal blood pressure and in stimulating smooth animal muscle, but yet still have substantial antagonistic effect on epinephrine-induced mobilization of free fatty acids compared with the above-mentioned prostaglandins. For example, the compound according to formula II, wherein X, Y, and Z are all —$CH_2CH_2$—, and $R_1$ and $R_2$ are both hydrogen, has less than 0.01 of the rabbit and guinea pig blood pressure lowering effect of an equal weight concentration $PGE_1$, 0.02 of the guinea pig ileum stimulating effect of $PGE_1$, and 0.12 of the rabbit duodenum stimulating effect of $PGE_1$. Similarly, the compound according to formula II, wherein Y and Z are both —$CH_2CH_2$—, X is trans —CH=CH—, and $R_1$ and $R_2$ are both hydrogen, exhibits blood pressure lowering and muscle stimulation as follows: rabbit blood pressure, 0.04; guinea pig blood pressure, 0.02; rabbit duodenum, 0.16; guinea pig ileum, 0.08; where for each test, an equal weight concentration of $PGE_1$ gives a value of one.

Thus, compounds of formula II show unexpected and outstanding advantages compared with, for example, $PGE_1$, in the control of lipid mobilization and associated free fatty acid levels in animals, including man. According to Carlson et al., "Inhibition of Lipid Mobilization," Chapter 57, pages 557–574, in "Handbook of Physiology," Waverly Press, Baltimore, Md. (1065) at page 574, "Inhibition of lipid mobilization occurs normally in the intact organism due to interplay of nutritional, hormonal and nervous factors." In certain diseases, e.g., vascular diseases, diabetes mellitus, and hyperthyroidism, abnormal lipid mobilization occurs and the free fatty acid content of body fluid increases. Since the novel compounds of formula II show antagonism of epinephrine-induced lipolysis in isolated rat fat-pads, those compounds are useful in experimental medicine for both in vitro and in vivo studies intended to lead to the prevention, symptom alleviation, and cure of diseases involving abnormal lipid mobilization. The novel formula II compounds are especially useful for that purpose because they are relatively free of side effects such as blood pressure lowering and smooth muscle stimulation exhibited by other known lipid mobilization inhibitors.

The novel prostanoic acid derivatives of formula III are similar to known prostaglandins, for example, $PGE_1$, in being extremely potent in lowering systemic arterial blood pressure in laboratory animals, for example, rabbits and guinea pigs, but differ from such as $PGE_1$ in being substantially less active than those in stimulating smooth animal muscle. Hence, the novel formula III compounds of this invention are valuable therapeutic agents for the treatment of hypertension not only because of their activity in lowering blood pressure but because they are substantially more specific in their action on the animal organism, producing substantially fewer unwanted side effects. The novel formula III compounds are administered by intravenous infusion of isotonic saline solutions at the rate of about 0.01 to about 10, preferably about 0.1 to about 0.2, micrograms per kilogram of animal weight per minute.

The novel formula III compounds are also useful because they can be administered to laboratory animals, preferably rats, to produce animals containing high levels of the compounds. Such animals can then serve as test animals in the search for and study of compounds which are antagonists of the administered compounds and which, for that reason, would be useful in reversing the effects of inadvertent overdoses of the extremely potent novel formula III compounds and in the treatment of allergic conditions. For that purpose, the formula III compound is advantageously administered to the test animal by continuous intravenous infusion in sterile saline solution, at the rate of about 0.01 to about 10, preferably 0.5 to 0.2, micrograms per kilogram of animal weight per minute until the desired level of compound has been reached or until the desired response in the animal has been obtained. Infusion can then be continued or stopped depending on the particular use to be made of the test animal.

The novel prostanoic acid derivatives of formula IV have a blood pressure lowering effect in animals, and hence are useful in the treatment of hypertension in the same manner described above for formula III compounds. In addition, formula IV compounds have a surprising and unexpected influence on animal cell growth in that they inhibit the usual tendency toward cell differentiation during growth. For example, addition of small amounts of formula IV compounds to isolated growing segments of chicken skin in a nutrient medium inhibits the formation of feather follicles. Because of that activity, formula IV compounds are useful in experimental medicine, for example, in studies of wound healing, in the study and possible control of teratogenesis, and in the study of other medical problems involving control of cell differentiation during embryological and subsequent animal growth.

For any of the above purposes, the novel prostanoic acids of this invention can be used in any of the forms encompassed by formulas II, III, and IV. It is especially preferred, however, that hydrocarbyl and carboxyacyl, when present in compounds of formulas II, III, or IV, be lower alkyl and lower alkanoyl, respectively.

As will be described hereinafter, certain of the novel compounds of this invention are prepared by enzymatic processes. In some instances, tissue fragments, lipids, cellular debris, foreign proteins, antigens, pyrogens, and the like may be mixed with the novel compound after it has been prepared. Use of the novel compounds for the above-described purpose may be hindered by some or any of those impurities. Moreover, the hereinafter described non-enzymatic processes which are used to produce certain of the novel compounds of this invention may simultaneously produce other prostanoic acid derivatives, or some of the prostanoic acid derivative reactant may remain unchanged. As pointed out above, prostanoic acid derivatives such as the prostaglandins tend to have multiple effects on animal organisms, and the properties of the particular side product or unused reactant are likely to cause interference with the intended use of the desired novel compound. For the above reasons, it is preferred that each of the novel compounds of this invention be obtained in essentially pure form before being used for the purposes described above. By the term "essentially pure form" is meant a form of the substance essentially free of so-called biological impurities such as the tissue fragments, lipids, cellular debris, foreign proteins, antigens, and pyrogens mentioned above, as well as certain other substances which will vary according to the formula type. Thus, essentially pure formula II compounds are those essentially free of prostanoic acid derivatives with a 15-hydroxy substituent; essentially pure formula III compounds are those essentially free of prostanoic acid derivatives with carbon-carbon unsaturation at the 13,14-position; essentially pure formula IV compounds are those essentially free of prostanoic acid derivatives saturated between carbons 8 and 12.

The compound according to formula II wherein Y and Z are —$CH_2CH_2$— and X is trans-CH=CH—, i.e., 11α-hydroxy-9,15-dioxoprosta-trans-13-enoic acid, is produced by oxidation of 11α-15-dihydroxy-9-oxoprosta-trans-13-enoic acid (PGE$_1$) with manganese dioxide, activated according to the procedure of Attenburrow et al., J. Chem. Soc., 1094 (1952). An alternative reagent for this oxidation is 2,3-dichloro-5,6-dicyano-1,4-benzoquinone. The manganese dioxide oxidation is advantageously carried out in the presence of an inert diluent, for example, chloroform. The desired product can be isolated by conventional techniques, for example by thin layer chromatography as will be more fully described hereinafter. Esters of PGE$_1$, for example the methyl ester, are also oxidized with manganese dioxide as described above to produce the corresponding esters of 11α-hydroxy-9,15-dioxoprosta-trans-13-enoic acid, i.e., compounds according to formula II wherein Y and Z are —$CH_2CH_2$—, X is

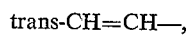

trans-CH=CH—, $R_1$ is hydrocarbyl, and $R_2$ is hydrogen.

The compound according to formula IV wherein $R_1$ is hydrogen, i.e., 9,15 - dioxoprosta-8(12),trans-13-dienoic acid, is produced by mixing 11α-hydroxy-9,15-dioxoprosta-trans-13-enoic acid with a concentrated aqueous-ethanol solution of an alkali metal hydroxide, preferably sodium hydroxide, in the range about 20° to about 40° C., until the desired reaction takes place. Acidification then gives the desired product. About 30 to 60 minutes of mixing at 25° C. is usually sufficient. The desired product can be isolated by conventional techniques, for example, as described by Bergström et al. for the preparation of PGE-278, J. Biol. Chem., 238, 3556 (1963).

The compound according to formula II wherein X, Y, and Z are —$CH_2CH_2$—, and $R_1$ and $R_2$ are hydrogen, i.e., 11α-hydroxy-9,15-dioxoprostanoic acid, is produced by catalytic hydrogenation of 11α-hydroxy-9,15-dioxoprosta-13-enoic acid, advantageously in the presence of a rhodium-carbon catalyst. Either of the analogous compounds, 11α - hydroxy-9,15-dioxoprosta-cis-5,trans-13-dienoic acid or 11α-hydroxy-9,15-dioxoprosta-cis-5,trans-13,cis - 17-trienoic acid, can also be hydrogenated catalytically in the presence of a rhodium-carbon catalyst, using two and three molecular equivalents of hydrogen, respectively, rather than the one molecular equivalent necessary for the catalytic hydrogenation of the 11α-hydroxy-9,15-dioxoprosta-13-enoic acid. These two alternative reagents are themselves produced by oxidation of 11α,15-dihydroxy-9-oxoprosta-cis-5,trans-13-dienoic acid (PGE$_2$) and 11α, 15-dihydroxy-9-oxoprosta-cis-5,trans-13,cis - 17 - trienoic acid, respectively, with manganese dioxide as described above for the oxidation of PGE$_1$ to 11α-hydroxy-9,15-dioxoprosta-trans-13-enoic acid.

Alternatively, esters of 11α-hydroxy-9,15-dioxoprostanoic acid, i.e., compounds according to formula II wherein X, Y, and Z are —$CH_2CH_2$—, $R_2$ is hydrogen, and $R_1$ is hydrocarbyl, are produced by catalytic hydrogenation of the corresponding esters of 11α-hydroxy-9,15-dioxoprosta-trans-13-enoic acid as described above for the hydrogenation of the latter acid. Similarly, the carboxyacylates and ester-carboxyacylates of 11α-hydroxy-9,15-dioxoprostanoic acid, i.e., compounds according to formula II wherein X, Y, and Z are —$CH_2CH_2$—, and wherein $R_1$ is hydrogen and $R_2$ is carboxyacyl, or wherein $R_1$ is hydrocarbyl and $R_2$ is carboxyacyl, are produced by catalytic hydrogenation of the corresponding carboxyacylates and ester-carboxyacylates of 11α - hydroxy-9,15-dioxoprosta-trans-13-enoic acid.

11α-Hydroxy-9,15-dioxoprostanoic acid can also be prepared by the interaction of 11α,15-dihydroxy-9-oxoprosta-trans-13-enoic acid (PGE$_1$) and certain of the enzymes present in a variety of animal tissues, for example, the lung tissue of the guinea pig, sheep, rat, rabbit, and man, and other types of tissues, e.g., the kidney and the intestine. 11α,15-Dihydroxy-9-oxoprostanoic acid, a known compound (Bergström et al., J. Biol. Chem., 238, 3557 (1963)), is also a product of this reaction.

Similar interaction of 11α,15-dihydroxy-9-oxoprosta-cis-5,trans-13-dienoic acid (PGE$_2$) and the enzymes of these animal tissues produces an analogous pair of products, 11α-hydroxy-9,15-dioxoprosta-cis - 5 - enoic acid and 11α,15-dihydroxy - 9 - oxoprosta-cis-5-enoic acid. The former is a compound according to formula II wherein X and Z are —$CH_2CH_2$—, Y is cis-CH=CH—, and $R_1$ and $R_2$ are hydrogen. The latter is a compound according to formula III wherein Z is —$CH_2CH_2$—, and $R_1$ and $R_2$ are hydrogen.

Similar interaction of 11α,15-dihydroxy-9-oxoprosta-cis-5,trans-13,cis-17-trienoic acid (PGE$_3$) and the enzymes of these animal tissues produces another analogous pair of products, 11α-hydroxy-9,15-dioxoprosta - cis - 5,cis-17-dienoic acid and 11α,15-dihydroxy-9-oxoprosta-cis-5,cis-17-dienoic acid. The former is a compound according to formula II wherein Y and Z are cis-CH=CH—, X is —$CH_2CH_2$—, and $R_1$ and $R_2$ are hydrogen. The latter is a compound according to formula III wherein Z is cis-CH=CH— and $R_1$ and $R_2$ are hydrogen.

The nature of the enzymes involved in these transformations, and the exact changes and reaction paths involved are not completely understood. Hydrogenation of the $C_{13}C_{14}$ double bond appears to be necessary for the formation of all products. Oxidation of $C_{15}$ hydroxyl group to a $C_{15}$ oxo group also appears to be necessary for the production of the three 11α-hydroxy-9,15-dioxo compounds. On the other hand, interaction of PGE$_1$ with the enzymes of swine lung tissue resulted in the formation of 11α - hydroxy - 9,15 - dioxoprosta-trans-13-enoic acid. With that particular enzyme system, only the oxidation at $C_{15}$ appears to take place. This last enzymatic reaction provides an alternative to the production of 11α-hydroxy-9,15-dioxoprosta-trans-13-enoic acid by manganese dioxide oxidation of PGE$_1$.

Of the various animal tissues mentioned above, the guinea pig lung tissue is preferred as the source of the enzymes necessary for the $C_{13}C_{14}$ double bond saturation and the $C_{15}$ hydroxy oxidation of PGE$_1$, PGE$_2$, and PGE$_3$. Minced tissues, whole tissue homogenates, or either the supernatant portion or the residue from centrifuged tissue homogenates, depending on the centrifuge force, can be used as sources of the necessary enzymes. Alternatively, the enzymes can be isolated from tissues in various stages of purity, for example, as acetone powders, by methods known in the art. See, for example, Neilands et al., "Outlines of Enzymes Chemistry," 2d. Ed., Wiley & Sons, Inc., New York, pp. 42–65 (1958); Schwimmer et al. In Nord, "Advances in Enzymology," Vol. 14, Interscience Publishers, Inc., New York, pp. 375–409 (1953); and Umbriet et al., "Manometric Techniques," 4th Ed., Burgess Publishing Co., pp. 114–176 (1964). The isolated enzymes can then be used in a substantially aqueous medium in place of tissue homogenates.

It is especially preferred to centrifuge a whole tissue homogenate at about $900 \times G$ for about 15 minutes and then to centrifuge the supernatant liquid therefrom at about $100,000 \times G$ for about 60 minutes. The desired enzymatic activity remains in the final supernatant liquid, and that liquid is a convenient enzyme source.

To carry out the enzymatic transformation, $PGE_1$, $PGE_2$, or $PGE_3$ is added to the above-described enzyme-containing liquid, and the mixture is incubated aerobically with agitation at 37° C. for about 30 to 60 minutes. The enzymatic reactions are then advantageously terminated by addition of several volumes of ethanol. The desired mixture of transformation products can then be isolated by conventional methods, for example, by evaporation of the ethanol, acidification, and extraction of said mixture with a suitable water-immiscible solvent, advantageously, diethyl ether. Evaporation of the ether extracts then give the mixture of products which can be separated by chromatography, advantageously, reversed phase chromatography.

The formula II, III, and IV prostanoic acid derivatives of this invention, wherein $R_1$ and/or $R_2$ is hydrogen can be transformed into various types of esters, for example, compounds of formulas II, III, and IV wherein $R_1$ is hydrocarbyl and $R_2$ is hydrogen, wherein $R_1$ is hydrogen or a pharmacologically acceptable cation and $R_2$ is carboxyacyl, and wherein $R_1$ is hydrocarbyl and $R_2$ is carboxyacyl.

Esterification of the carboxyl moiety in formula II, III, and IV prostanoic acids wherein $R_1$ is hydrogen and $R_2$ is hydrogen or carboxyacyl can be accomplished by interaction of the free acid with the appropriate diazohydrocarbon. For example, when diazomethane is thus used, methyl esters are produced. Similar use of diazoethane, diazobutane, 1-diazo-2-ethylhexane, cyclohexyldiazomethane, phenyldiazomethane, 1-diazo-2-propene, and the like gives ethyl, butyl, 2-ethylhexyl, cyclohexylmethyl, benzyl, allyl, and like esters of formula II, III, and IV acids.

Esterification with diazohydrocarbons is carried out by mixing a soution of the diazohydrocarbon in a suitable inert solvent, preferably diethyl ether, with the prostanoic acid reactant, advantageously in the same or a different inert diluent. After the esterification reaction is complete, the solvent is removed by evaporation and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., Vol. 8, pp. 389–394 (1954).

An alternative method for esterification of the carboxyl moiety of formula II, III, and IV prostanoic acids comprises transformation of the free acid to the corresponding silver salt, followed by interaction of that salt with a hydrocarbyl iodide. Examples of suitable iodides are methyl iodide, ethyl iodide, butyl iodide, isobutyl iodide, tert-butyl iodide, decyl iodide, benzyl iodide, cyclohexyl iodide, crotyl iodide, and the like. The silver salts are pared by conventional methods, for example, by dissolving the acid in cold dilute aqueous ammonia, evaporating the excess ammonia at reduced pressure, and then adding the stoichiometric amount of silver nitrate.

Carboxyacylation of the hydroxy group in formula II prostanoic acids and the two hydroxy groups in formula III prostanoic acids, wherein $R_1$ is hydrogen or hydrocarbyl and $R_2$ is hydrogen, is accomplished by interaction of the hydroxy compound with a carboxyacylating agent, preferably a carboxylic acid anhydride, for example, the anhydrides of alkanoic, cycloalkanoic, alkenoic, cycloalkenoic, aralkanoic, aromatic, and heterocyclic carboxylic acids. For example, use of acetic anhydride gives the corresponding diacetate. Similar use of propionic anhydride, butyric anhydride, isobutyric anhydride, acrylic anhydride, crotonic anhydride, cyclohexanecarboxylic anhydride, benzoic anhydride, naphthoic anhydride, p-chlorophenoxyacetic anhydride, and furoic anhydride gives the corresponding dicarboxyacylates.

The carboxyacylation is advantageously carried out by mixing the hydroxy compound and the acid anhydride preferably in the presence of a tertiary amine such as pyridine or triethylamine. A substantial excess of the anhydride should be used, preferably about 10 to about 10,000 moles of anhydride per mole of the hydroxy compound reactant. The excess anhydride serves as a reaction diluent and solvent. An inert organic diluent, for example, dioxane, can be added. It is preferred to use enough of the tertiary amine to neutralize the carboxylic acid produced by the reaction as well as any free carboxyl groups present in the hydroxy compound reactant.

The carboxyacylation reaction is preferably carried out in the range about 0° to about 100° C. The necessary reaction time will depend on such factors as the reaction temperature and the nature of the anhydride and tertiary amine reactants. With acetic anhydride, pyridine, and a 25° C. reaction temperature, a 12 to 24-hour reaction time should be used.

The carboxyacylated product is isolated from the reaction mixture by conventional methods. For example, the excess anhydride can be decomposed with water, and the resulting mixture acidified and then extracted with a solvent such as diethyl ether. The desired carboxyacylate will usually be extracted by the ether and is recoverable therefrom by evaporation. If desired, the carboxyacylate can be purified by conventional methods, preferably by chromatography.

Each of the above described formula II, III, and IV prostanoic acid derivatives wherein $R_1$ is hydrogen and $R_2$ is hydrogen or carboxyacyl can be transformed to pharmacologically acceptable salts by neutralization with appropriate amounts of the corresponding inorganic or organic base, examples of which correspond to the cations listed above. These transformations can be carried out by a variety of procedures known in the art to be generally useful for the preparation of inorganic, i.e., metal or ammonium salts, amine acid addition salts, and quaternary ammonium salts. The choice of procedure will depend in part upon the solubility characteristics of the particular salt to be prepared. In the case of the inorganic salts, it is usually suitable to dissolve the prostanoic acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the formula II, III, or IV prostanoic acid. Evaporation of the water or addition of a water-miscible solvent of moderate polarity, for example, a lower alkanol or a lower alkanone gives the solid inorganic salt if that form is desired.

To produce an amine salt, the prostanoic acid can be dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it can usually be obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the prostanoic acid with the stoichiometric amount of the corresponding quaternary ammonium hydroxide in water solution, followed by evaporation of the water.

The invention can be more fully understood by the following examples.

In the examples which follow, thin layer chromatography, hereinafter TLC, was used as a means of characterization, identification, and determining homogeneity. The TLC was performed essentially as described by Gréen et al., J. Lipid Research, 5, 117 (1964). The glass plates were coated with silica gel G (Merck, A. G., West Germany) with or without silver nitrate (1 g. per 30 g. of silica gel). The upper phases of the following solvent systems were used with silica gel containing silver nitrate:

A III—ethylacetate-acetic acid - 2,2,4 - trimethylpentane-water (100:10:30:100)
A IV—ethylacetate-benzene-acetic acid - 2,2,4 - trimethylpentane-water (80:30:10:30:100)
A VIII—ethylacetate-acetic acid-2,2,4-trimethylpentane-water (110:15:30:100).

The following solvent system was used with silica gel containing no silver nitrate:

A V—benzene-dioxane-acetic acid (65:15:2).

The chromatographic spots were detected by spraying the plates with concentrated sulfuric acid and then heating at 150° to 200° C.

EXAMPLE 1

11α-hydroxy-9,15-dioxoprosta-trans-13-enoic acid

A solution of $PGE_1$ (20 mg.) in 80 ml. of chloroform was stirred with 200 mg. of activated manganese dioxide for 60 hours at 25° C. The resulting mixture was filtered, and the filtrate was evaporated to give an oil, 6 mg. of which was purified by chromatography on 1 g. of silica acid, eluting with ethyl acetate-benzene (1:3). Evaporation of the eluate gave 4.6 mg. of 11α-hydroxy-9,15-dioxoprosta-trans-13-enoic acid in the form of a colorless oil; single spot with $R_F$ 0.3 on TLC with solvent system A IV.

U.V. (ethanol) 230 m$\mu$ ($\epsilon$=8450).
I.R. (principal bands; no diluent) 1620, 1670, 1710, 1740 cm.$^{-1}$.

Following the procedure of example 1 but using in place of the $PGE_1$, methyl 11α,15-dihydroxy-9-oxoprosta-trans-13-enoate, there is obtained methyl 11α-hydroxy-9,15-dioxoprosta-trans-13-enoate.

EXAMPLE 2

11α-hydroxy-9,15-dioxoprostanoic acid

A mixture of 11α-hydroxy-9,15-dioxoprosta-trans-13-enoic acid (3 mg.), ethanol (3 ml.), and 5% rhodium on carbon (3 mg.) was shaken with hydrogen at about 25° C. and one atmosphere pressure. One molecular equivalent of hydrogen was absorbed in 30 minutes. The hydrogenation was then stopped, the catalyst was removed by filtration, and the solvent was evaporated to give 11α-hydroxy-9,15-dioxoprostanoic acid in the form of a colorless oil; single spots with $R_F$ values 0.64, 0.55, 0.53, and 0.82 on TLC with solvent systems A III, A IV, A V, and A VIII, respectively.

I.R. (principal bands; chloroform solution) 5.76 and 5.85$\mu$.

Following the procedure of example 2, methyl 11α-hydroxy-9,15-dioxoprosta-trans-13-enoate; 11α-acetoxy-9,15-dioxoprosta-trans-13-enoic acid; and methyl 11α-acetoxy-9,15-dioxoprosta-trans-13-enoate are hydrogenated to give methyl 11α-hydroxy-9,15-dioxoprostanoate; 11α-acetoxy-9,15-dioxoprostanoic acid; and methyl 11α-acetoxy-9,15-dioxoprostanoate, respectively.

EXAMPLE 3

9,15-dioxoprosta-8(12),trans-13-dienoic acid

A solution of 11α-hydroxy-9,15-dioxoprosta-trans-13-enoic acid (8 mg.) in a mixture of 5 ml. of ethanol and 5 ml. of aqueous normal sodium hydroxide solution was allowed to stand at 25° C. for 30 minutes. The U.V. absorption maximum of the solution shifted during that time from 230 m$\mu$ to 280 m$\mu$. The resulting solution was evaporated under reduced pressure to about one-half of its original volume. One-half volume of water was added, and the solution was acidified with hydrochloric acid and extracted three times with diethyl ether. The ether extracts were combined, washed with a small volume of water, and then dried with sodium sulfate. Evaporation of the ether gave 9,15-dioxoprosta-8(12),trans-13-dienoic acid.

U.V. (ethanol) 280 m$\mu$.

EXAMPLE 4

11α-hydroxy-9,15-dioxo-prostanoic acid

The lungs of 30 male guinea pigs, each pig weighing 300 to 700 g., were rapidly excised and immediately chilled to 0° C. in a Bücher medium (0.02 M $KH_2PO_4$-0.072 M $K_2HPO_4$-0.0276 M nicotinamide-0.0036 M $MgCl_2$, pH 7.4). The lungs were then minced and homogenized with an Ultra-turrax homogenizer. The homogenate volume was adjusted to yield a tissue to buffer ratio of 1:4. The homogenate was then centrifuged for 15 minutes at 900×G and the supernatant at 105,000×G for 60 minutes. All operations were carried out at 0 to 4° C. The resulting particle-free clear supernatant was mixed with $PGE_1$ (20$\mu$g. per ml. of supernatant), and the mixture was incubated at 37° C. for 30 minutes with shaking. The incubation was then terminated by addition of 9 volumes of ethanol. The resulting mixture was filtered and evaporated to a small volume. The aqueous residue was acidified to pH 3, and was extracted three times with diethyl ether. The combined diethyl ether extracts were evaporated to dryness, and the resulting residue was subjected to reversed phase partition chromatography as described by Norman, Acta Chem. Scan., 7, 1413 (1953), using as column support Hyflo Super-Cel made hydrophobic by treatment with dimethyldichlorosilane, as stationary phase chloroform-isooctanol (15:15), and as moving phase methanol-water (140:160).

In preliminary small-scale experiments, the $PGE_1$ added to the lung homogenates contained a small amount of tritium-labeled $PGE_1$, prepared by partial tritiation of $PGE_2$ in ethyl acetate and in the presence of a 5% palladium on charcoal catalyst (Samuelsson, J. Biol. Chem., 239, 4091 (1964)). The metabolites which resulted were radioactive, and two separated peaks of eluate radioactivity were observed in the reversed phase partition chromatography. Thus the chromatographic behavior of the two metabolites was determined. Preparative reversed phase partition chromatography then gave two groups of eluates, each containing a separate compound peak. Those eluate groups were combined separately and evaporated to dryness. Each residue was then subjected to chromatography on silicic acid columns prepared with ethyl acetate-benzene (1:9) and gradually eluted with increasing concentrations of ethyl acetate in benzene. The silicic acid column containing the second compound peak to emerge from the reversed phase partition chromatographic column was finally eluted with ethyl acetate-benzene (1:4), and the eluate was evaporated to give essentially pure 11α-hydroxy - 9,15-dioxoprostanoic acid; single spots with $R_F$ values 0.64, 0.55, and 0.53 on TLC with solvent systems A III, A IV, and A V, respectively.

I.R. (principal bands; chloroform solution) 5.77 and 5.87$\mu$.

The first compound peak to emerge from the reversed phase chromatographic column contained 11α,15-dihydroxy-9-oxo-prostanoic acid (dihydro $PGE_1$).

EXAMPLE 5

11α-hydroxy-9,15-dioxoprosta-cis-5-enoic acid and 11α,15-dihydroxy-9-oxoprosta-cis-5-enoic acid Following the procedure of example 4, a particle-free guinea pig lung homogenate was prepared. Also following the procedure of example 4, that homogenate was mixed with PGE$_2$ (20 μg. per ml. of supernatant), and the mixture was incubated at 37° C. for 30 minutes. The resulting metabolite mixture was isolated as described in example 4. That mixture was subjected to reversed phase partition chromatography as described in example 4.

In preliminary small scale experiments, the PGE$_2$ added to the lung homogenate contained a small amount of tritium-labeled PGE$_2$, prepared by partial tritiation of PGE$_3$ in ethyl acetate and in the presence of a 5% palladium on barium sulfate catalyst (Änggard et al., J. Biol. Chem., 240, 1932 (1965)). The metabolites which resulted were radioactive, and two separated peaks of eluate radioactivity were observed in the reversed phase partition chromatography. Thus the chromatographic behavior of the two metabolites was determined. Preparative reversed phase partition chromatography then gave two groups of eluates, each containing a separate compound peak. Those eluate groups were combined separately and evaporated to dryness. Each residue was then separately subjected to chromatography on silicic acid columns as described in example 4.

The silicic acid column containing the first compound peak to emerge from the reversed phase partition chromatographic column was finally eluted with ethyl acetate-benzene (2:3), and the eluate was evaporated to give essentially pure 11α,15-dihydroxy-9-oxoprosta-cis-5-enoic acid; single spot with R$_F$ 0.32 on TLC with solvent system A III.

The silicic acid column containing the second compound peak to emerge from the reversed phase partition chromatographic column was finally eluted with ethyl acetate-benzene (1:3), and the eluate was evaporated to give essentially pure 11α-hydroxy - 9,15-dioxoprosta-cis-5-enoic acid; single spot with R$_F$ values 0.65 and 0.37 on TLC with solvent systems A III and A V, respectively.

I.R. (principal bands; chloroform solution) 5.77 and 4.87μ.

EXAMPLE 6

11α-hydroxy - 9,15-dioxoprosta-cis - 5,cis-17-dienoic acid and 11α,15-dihydroxy - 9-oxoprosta-cis-5,cis-17-dienoic acid Following the procedure of example 4, a particle-free guinea pig lung homogenate was prepared. Also following the procedure of example 4, that homogenate was mixed with PGE$_3$ (25μg. per ml. of supernatant), and the mixture was incubated at 37° for 30 minutes. The resulting metabolite mixture was isolated as described in example 4. That mixture was subjected to reversed phase partition chromatography as described in example 4 but using methanol-water (135:165) as the moving phase.

In preliminary small scale experiments, the PGE$_3$ added to the lung homogenate contained a small amount of C$^{14}$ labeled PGE$_3$ (Änggard et al., Biochemistry, 4, 1864 (1965)). The metabolites which resulted were radioactive, and two separated peaks of eluate radioactivity were observed in the reversed phase partition chromatography. Thus the chromatographic behavior of the two metabolites was determined. Preparative reversed phase partition chromatography then gave two groups of eluates, each containing a separate compound peak. Those eluate groups were combined separately and evaporated to dryness. Each residue was then separately subjected to chromatography on silicic acid columns as described in example 4 except that a 1:19 ratio of ethyl acetate and benzene was used to prepare the columns.

The silicic acid column containing the first compound peak to emerge from the reversed phase partition chromatographic column was finally eluted with ethyl acetate-benzene (2:3), and the eluate was evaporated to give essentially pure 11α,15-dihydroxy - 9-oxoprosta-cis-5,cis-17-dienoic acid; single spot on TLC with solvent system A VIII.

I.R. (principal bands; chloroform solution) 5.77 and 5.87μ.

The silicic acid column containing the second compound peak to emerge from the reversed phase partition chromatographic column was finally eluted with ethyl acetate-benzene (1:3), and the eluate was evaporated to give essentially pure 11α-hydroxy-9,15-dioxoprosta-cis-5,cis-17-dienoic acid; single spot with R$_F$ 0.48 on TLC with solvent system A VIII.

I.R. (principal bands; chloroform solution) 5.77 and 5.87μ.

EXAMPLE 7

Methyl 11α,15-dihydroxy-9-oxoprosta-cis-5,cis-17-dienoate

Essentially pure 11α,15-dihydroxy - 9 - oxoprosta-cis-5,cis-17-dienoic acid (2 mg.) was dissolved in a mixture of methanol and diethyl ether 1:9 (5 ml.). A diethyl ether solution of diazomethane (about 200 mg.) was added, and the mixture was allowed to stand at about 25° C. for 3 minutes. The reaction mixture was then evaporated to dryness to give methyl 11α,15-dihydroxy-9-oxoprosta-cis-5,cis-17-dienoate; single spot with R$_F$ 0.19 on TLC with the upper phase of ethyl acetate - methanol - water (100:5:100) as solvent system on a silica gel plate containing silver nitrate.

Following the procedure of example 7 but substituting for diazomethane, diazoethane; diazobutane; 1-diazo-2-ethylhexane; cyclohexyldiazomethane; phenyldiazomethane; and diazopropene, there are obtained the ethyl, butyl, 2-ethylhexyl, cyclohexylmethyl, benzyl, and allyl esters, respectively, of 11α,15-dihydroxy-9-oxoprosta-cis-5,cis-17-dienoic acid.

EXAMPLE 8

Methyl 11α,15-dihydroxy-9-oxoprosta-cis-5-enoate

Following the procedure of example 7, 11α,15-dihydroxy-9-oxoprosta-cis-5-enoic acid was reacted with diazomethane to give methyl 11α,15-dihydroxy-9-oxoprosta-cis-5-enoate.

EXAMPLE 9

Methyl 11α-hydroxy-9,15-dioxoprosta-trans-13-enoate

Following the procedure of example 7, 11α-hydroxy-9,15-dioxoprosta-trans-13-enoic acid was reacted with diazomethane to give methyl 11α-hydroxy - 9,15 - dioxoprosta-trans-13-enoate.

Following example 9 but using in place of the diazomethane, each of the other above-mentioned diazohydrocarbons, there are obtained the corresponding hydrocarbyl esters of 11α-hydroxy-9,15-dioxoprosta-trans-13-enoic acid.

EXAMPLE 10

Methyl 11α-hydroxy-9,15-dioxoprostanoate

Following the procedure of example 7 but using a reaction time of one minute and a reaction temperature 10° C., 11α-hydroxy-9,15-dioxoprostanoic acid was reacted with diazomethane to give methyl 11α-hydroxy-9,15-dioxoprostanoate.

Also following the procedure of example 7, 11α-hydroxy-9,15-dioxoprosta-cis-5-enoic acid, 11α - hydroxy-9,15-dioxoprosta-cis-5,cis-17-dienoic acid, and 9,15 - dioxoprosta-8(12),trans-13-dienoic acid are each reacted with diazomethane and with each of the other above-mentioned diazohydrocarbons to give the corresponding hydrocarbyl esters.

EXAMPLE 11

Methyl 11α,15-diacetoxy-9-oxoprosta-cis-5,cis-17-dienoate

Methyl 11α,15-dihydroxy-9-oxoprosta - cis - 5,cis - 17-dienoate (2 mg.) was mixed with acetic anhydride (0.5 ml.) and pyridine (0.5 ml.). The resulting mixture was allowed to stand at 25° C. for 16 hours. Pyridine-water (1:1) was then added to the ice-cooled reaction mixture and the resulting mixture was extracted with diethyl ether. The diethyl ether extract was washed successively with 2 N hydrochloric acid, 5% aqueous sodium bicarbonate solution, and water, and was then evaporated to give methyl 11α,15 - diacetoxy - 9 - oxoprosta - cis - 5,cis-17-dienoate.

Following the procedure of example 11, methyl 11α,15-dihydroxy-9-oxoprosta-cis-5-enoate; methyl 11α-hydroxy-9,15-dioxoprosta-trans-17-enoate; methyl 11α-hydroxy-9,15-dioxoprostanoate; methyl 11α-hydroxy - 9,15 - dioxoprosta-cis-5-enoate; and methyl 11α-hydroxy-9,15-dioxoprosta-cis-5,cis-17-dienoate are each reacted with acetic anhydride to give methyl 11α,15-diacetoxy-9-oxoprosta-cis-5-enoate; methyl 11α - acetoxy-9,15-dioxoprosta-trans-17-enoate; methyl 11α-acetoxy - 9,15 - dioxoprostanoate; methyl 11α-acetoxy-9,15-dioxoprosta-cis - 5 - enoate, and methyl 11α - acetoxy - 9,15 - dioxoprosta - cis - 5,cis-17-dienoate, respectively.

Also following the procedure of example 11 but using in place of the acetic anhydride, propionic anhydride; butyric anhydride; acrylic anhydride; crotonic anhydride; cyclohexanecarboxylic anhydride; benzoic anhydride; naphthoic anhydride; p-chlorophenoxyacetic anhydride; and furoic anhydride, there are obtained the corresponding 11α,15-dicarboxyacyl derivatives of methyl 11α,15-dihydroxy-9-oxoprosta-cis-5,cis - 17 - dienoate. In a similar manner, each of the other methyl esters mentioned above is transformed to the carboxyacylated derivatives corresponding to each of those specific carboxylic acid anhydrides.

EXAMPLE 12

11α,15-diacetoxy-9-oxoprosta-cis-5,cis-17-dienoic acid

Essentially pure 11α,15 - dihydroxy-9-oxoprosta-cis-5-cis-17-dienoic acid (2 mg.) was mixed with acetic anhydride (0.5 ml.) and pyridine (0.5 ml.). The resulting mixture was allowed to stand at 25° C. for 18 hours. The reaction mixture was then cooled with ice, diluted with water, and acidified with dilute hydrochloric acid to pH 1. That mixture was then extracted three times with diethyl ether. The combined diethyl ether extracts were washed successively with 2 N hydrochloric acid and water. Evaporation of the diethyl ether gave 11α,15-diacetoxy-9-oxoprosta-cis-5,cis-17-dienoic acid.

Following the procedure of example 12, 11α,15-dihydroxy-9-oxoprosta-cis-5-enoic acid; 11α - hydroxy-9,15-dioxoprosta-trans-13-enoic acid; 11α-hydroxy - 9,15 - dioxoprostanoic acid; 11α-hydroxy-9,15-dioxoprosta-cis-5-enoic acid; and 11α-hydroxy - 9,15 - dioxoprosta-cis-5,cis - 17-dienoic acid are each reacted with acetic anhydride to give 11α,15-diacetoxy-9-oxoprosta-cis-5-enoic acid; 11α - acetoxy-9,15-dioxoprosta-trans-13-enoic acid; 11α-acetoxy - 9, 15-dioxoprostanoic acid; 11α - acetoxy-9,15-dioxoprosta-cis-5-enoic acid; and 11α-acetoxy-9,15-dioxoprosta-cis-5,cis-17-dienoic acid, respectively.

Also following the procedure of example 12 but using in place of the acetic anhydride, each of the other abovementioned carboxylic anhydrides, there are obtained the corresponding 11α,15-dicarboxyacyl derivatives of 11α,15-dihydroxy-9-oxoprosta-cis-5,cis-17-dienoic acid. In a similar manner, each of the other prostanoic acids mentioned above is transformed to the carboxyacylated derivative corresponding to each of those specific carboxylic acid anhydrides.

EXAMPLE 13

Sodium 11α,15-dihydroxy-9-oxoprosta-cis-5,cis-17-dienoate

Essentially pure 11α,15-dihydroxy-9-oxoprosta-cis-5,cis-17-dienoic acid (2 mg.) was dissolved in 3 ml. of water-ethanol 1:1. The solution was cooled to about 10° C. and was neutralized with an equivalent amount of 0.1 N aqueous sodium hydroxide solution. Evaporation to dryness gave essentially pure sodium 11α,15-dihydroxy-9-oxoprosta-cis-5,cis-17-dienoate.

Following the procedure of example 13 but using potassium hydroxide, calcium hydroxide, tetramethylammonium hydroxide, calcium hydroxide, tetramethylammonium hydroxide, and benzyltrimethylammonium hydroxide, there are obtained the corresponding salts of essentially pure 11α,15-dihydroxy-9-oxoprosta-cis-5,cis-17-dienoic acid.

Also following the procedure of example 13, 11α,15-dihydroxy-9-oxoprosta-cis - 5 - enoic acid; 11α-hydroxy-9,15-dioxoprostatrans-13-enoic acid; 11α-hydroxy-9,15-dioxoprostanoic acid; 11α-hydroxy-9,15-dioxoprosta-cis-5-enoic acid; 11α-hydroxy-9,15-dioxoprosta-cis-5,cis-17-dienoic acid; and 9,15 - dioxoprosta - 8(12),trans-13-dienoic acid are each transformed to the corresponding sodium, potassium, calcium, tetramethylammonium, and benzyltrimethylammonium salts.

Also following the procedure of example 13, there are also obtained the above-mentioned salts of each of the other above described carboxyacylated prostanoic acid.

As discussed above, PGE$_2$ and PGE$_3$, as well as their hydrocarbyl esters, are oxidized with manganese dioxide to produce 11α-hydroxy-9,15-dioxoprosta-cis-5,trans-13-dienoic acid and 11α1hydroxy-9,15-dioxoprosta-cis-5, trans-13,cis-17-trienoic acid, respectively, as well as their hydrocarbyl esters. Also as discussed above, these unsaturated oxidation products are useful as intermediates in the production of 11α-hydroxy-9,15-dioxoprostanoic acid or its hydrocarbyl esters by catalytic hydrogenation. The latter hydrogenation products are compounds within the scope of formula II and are useful as described above for formula II compounds. These same unsaturated oxidation products, i.e., the free acids and the hydrocarbyl esters thereof, as well as the carboxyacylates and pharmacologically acceptable salts thereof, also have substantial antagonistic effect on epinephrine-induced mobilization of free fatty acids, and therefore are useful, especially in essentially pure form, for the same purposes and in the same manner both as described above for compounds of formula II, being also relatively inactive in lowering systemic animal blood pressure and in stimulating smooth animal muscle as are the compounds of formula II. For that reason, the formula II genus of compounds is rewritten to include these additional compounds as follows:

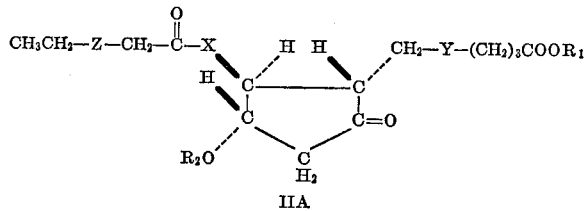

IIA wherein X, Y, and Z are —CH$_2$CH$_2$—, wherein X is —CH$_2$CH$_2$—, Y is cis-CH=CH—, and Z is —CH$_2$CH$_2$— or cis-CH=H—, wherein X is trans-CH=CH—, and Y and Z are —CH$_2$CH$_2$—, or wherein X is trans-CH=CH—, Y is cis-CH=CH—, and Z is —CH$_2$CH$_2$— or cis-CH=CH—, wherein $R_1$ is hydrogen, hydrocabyl, or a pharmacologically acceptable cation, and wherein $R_2$ is hydrogen or carboxyacyl.

The novel compounds of this invention also include compounds of the following formula, especially in essentially pure form:

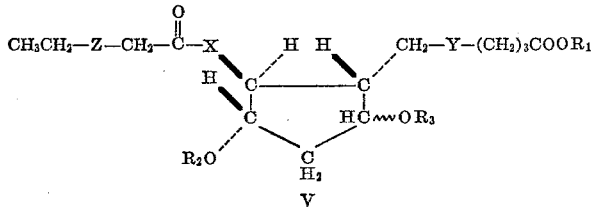

V wherein X, Y, and Z are —$CH_2CH_2$—, wherein X is trans-CH=CH—, and Y and Zare —$CH_2CH_2$—, or wherein X is trans-CH=CH—, Y is cis-CH=CH—, and Z is —$CH_2CH_2$— or cis-CH=CH—, wherein $R_1$ is hydrogen, hydrocarbyl, or a pharmacologically acceptable cation, wherein ~ is a generic expression denoting an alpha or a beta configuration for the $OR_3$ moiety, and wherein $R_2$ and $R_3$ are hydrogen or carboxyacyl, with the proviso that if $R_3$ is carboxyacyl, $R_2$ is also carboxyacyl.

In compounds of formula V, the $OR_2$ moiety is in alpha configuration when it is on the same side of the cyclopentane ring (carbons 8, 9, 10, 11, and 12 with reference to formula I) as the C–7, C–8 bond, and is in beta configuration when it is on the plane side opposite to the C–7, C–8 bond. Formula V encompasses 9-alpha compounds and 9-beta compounds. In formula V, the $R_2O$ moiety is in beta configuration.

The novel compounds of this invention also include compounds of the following formula, especially in essentially pure form:

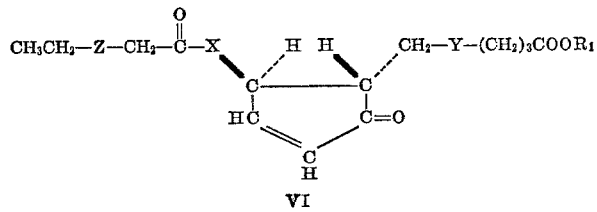

VI wherein X, Y, and Z are —$CH_2CH_2$—, wherein X is trans-CH=CH—, and Y and Z are —$CH_2CH_2$—, or wherein X is trans-CH=CH—, Y is cis-CH=CH—, and Z is —$CH_2CH_2$— or cis-CH=CH—, and wherein $R_1$ is hydrogen, hydrocarbyl, or a pharmacologically acceptable cation.

Regarding compounds of formulas IIA, V and VI, examples of hydrocarbyl, carboxyacyl, and pharmacologically acceptable cations, and preferences for those, are as given above regarding formula II, III, and IV compounds.

The novel prostanoic acid derivatives of formula V wherein the $OR_3$ moiety is in beta configuration and the novel prostanoic acid derivatives of formula VI lower systemic arterial blood pressure in laboratory animals. Hence, they are useful for the same purposes and are administered in the same manner as described above for compounds of formula III, i.e., for the treatment of hypertension in mammals, including man, domestic animals, and laboratory animals. For example, intravenous infusion of isotonic saline solutions of these compounds at the rate of about 1 to about 250 micrograms per kilogram of animal weight per minute is useful in the treatment of hypertension.

These novel formula V beta and formula VI compounds are especially useful for this purpose because they are substantially more specific in their action on the animal organism, producing substantially fewer unwanted side effects than, for example, $PGE_1$ which is known to be useful for the same purposes.

The novel prostanoic acid derivatives of formula V wherein the $OR_3$ moiety is is alpha configuration have a venoconstrictor action when administered to mammals. The result is a reduction in venous capacity and an increase in cardiac output. Because of that activity, these novel formula V alpha compounds are useful to reduce or prevent hypotension in mammals including man, domestic animals, and laboratory animals. For example, intravenous infusion of isotonic saline solutions of these compounds at the rate of about 1 to about 250 micrograms per kilogram of animal weight pre minute is useful in the treatment of shock.

For the above uses, these novel formula V alpha, formula V beta, and formula VI compounds can be administered intravenously, intramuscularly, or orally, using any of the forms encompassed by those formulas. It is especially preferred, however, that hydrocarbyl and carboxyacyl, when present, be lower alkyl and lower alkanoyl, respectively. In particular, for intravenous administration of aqueous solutions, it is preferred that $R_1$ be a pharmacologically acceptable cation, although the free acid form and hydrocarbyl or carboxyacyl esters can also be used in solvent systems known in the art to be suitable for intravenous injection.

As will be described hereinafter, the novel formula V alpha, formula V beta, and formula VI prostanoic acid derivatives of this invention are prepared by enzymatic processes, as well as by non-enzymatic processes. In some instances, tissue fragments, lipids, cellular debris, foreign proteins, antigens, pyrogens, and the like may be mixed with the novel compound after it has been prepared. Use of these novel compounds for the above-described purposes may be hindered by some or any of those impurities. Moreover, other prostanoic acid derivatives are used as reactants in these enzymatic and non-enzymatic processes. As pointed out above, prostanoic acid derivatives such as the prostaglandins tend to have multiple effects on animal's organisms, and the properties of unused reactant or even some side product is likely to cause interference with the intended use of the desired novel compound. For these reasons, it is preferred that these novel compounds be obtained and used in essentially pure form. The term "essentially pure form" means a form of the substance essentially free of so-called biological impurities such as the tissue fragments, lipids, cellular debris, foreign proteins, antigens, and pyrogens mentioned above, as well as essentially free of prostanoic acid derivatives containing a 15-hydroxy substituent.

The novel formula IIA, V alpha, V beta, and VI compounds of this invention are produced by oxidation of the corresponding prostanoic acid derivatives wherein the C–15 position bears a hydroxy group rather than a carbonyl group as in these novel compounds. Some of these C–15 oxidations are described above. In some instances when X is trans-CH=CH—, reductions of that trans-CH=CH— to —$CH_2CH_2$— also occurs during the C–15 oxidation.

These 15-hydroxy prostanoic acid derivative reactants are known in the art or can be prepared by methods known in the art. See, for example, Samuelsson, Angew. Chem. Intern. Ed. Eng., 4,410 (1965) and South African Pat. No. 66/3,600. For example, the formula V compound wherein $R_1$, $R_2$, and $R_3$ are each hydrogen, X is trans-CH=CH—, Y and Z are each —$CH_2CH_2$—, and the $OR_3$ moiety is in alpha configuration, is prepared by oxidation of $9\alpha,11\alpha,15$-trihydroxyprosta-trans-13-enoic acid ($PGF_{1\alpha}$) which can be isolated from a variety of animal tissues or can be prepared by sodium borohydride reduction of the known $11\alpha,15$-dihydroxy-9-oxoprosta-trans-13-enoic acid ($PGE_1$). The corresponding $9\beta$-hydroxy compound ($PGF_{1\beta}$) is also produced by that reduction, and can be separated from the $PGF_{1\alpha}$ and itself oxidized to the corresponding formula V compound wherein $R_1$, $R_2$, and $R_3$ are each hydrogen, X is trans-CH=CH—, Y and Z are each —$CH_2CH_2$—, and the OR₃ moiety is in beta configuration. The prior art sources of the other necessary 15-hydroxy reactants will be obvious to those skilled in this art.

This C-15 oxidation can be carried out enzymatically or, in most cases, chemically.

Enzymatic C-15 oxidation requires a dehydrogenase enzyme found in a wide variety of animal tissues, for example, the guinea pig lung tissue described and used above. As discussed above, in many animal tissues, this dehydrogenase enzyme is accompanied by a reducing enzyme which changes $C_{13}C_{14}$ trans double bonds to —$CH_2CH_2$—. Although the latter enzyme can be separated from the desired dehydrogenase enzyme by methods known in the art, there is particular advantage in using swine lung tissue since that tissue contains the dehydrogenase enzyme system but not the reducing enzyme.

The use of this dehydrogenase enzyme of swine lung to oxidize 11α,15-dihydroxy-9-oxoprosta-trans-13-enoic acid (PGE₁) to 11α-hydroxy-9,15-dioxoprosta-trans-13-enoic acid is described above. Additional experimental details are set forth in an article in Arkiv för Kemi, vol. 25, No. 27, 293 (1966).

Using the same enzymatic oxidation procedure described in that article 11α,15-dihydroxy-9-oxoprostanoic acid (dihydro-PGE₁), 11α,15-dihydroxy-9-oxoprosta-cis-5,trans-13-dienoic acid (PGE₂), and 11α,15-dihydroxy-9-oxoprosta-cis-5,trans-13,cis-17-trienoic acid (PGE₃) were transformed to the formula IIA compounds 11α-hydroxy-9,15-dioxoprostanoic acid, 11α-hydroxy-9,15-dioxoprosta-cis-5,trans-13-dienoic acid, and 11α-hydroxy-9,15-dioxoprosta-cis-5,trans-13,cis-17-trienoic acid, respectively. Those products are isolated and purified as described in that article for the isolation and purification of 11α-hydroxy-9,15-dioxoprosta-trans-13-enoic acid.

The same C-15 enzymatic oxidation procedure was used to oxidize

9α,11α,15-trihydroxyprostanoic acid (dihydro-PGF₁α),
9β,11α,15-trihydroxyprostanoic acid (dihydro-PGF₁β),
9α,11α,15-trihydroxyprosta-trans-13-enoic acid (PGF₁α),
9β,11α,15-trihydroxyprosta-trans-13-enoic acid (PGF₁β),
9α,11α,15-trihydroxyprosta-cis-5,trans-13-dienoic acid (PGF₂α),
9β,11α,15-trihydroxyprosta-cis-5,trans-13-dienoic acid PGF₂β),
9α,11α,15-trihydroxyprosta-cis-5,trans-13,cis-17-trienoic acid (PGF₃α), and
9β,11α,15-trihydroxyprosta-cis-5,trans-13,cis-17-trienoic acid (PGF₃β), thereby producing the formula V compounds 9α,11α,dihydroxy-15-oxoprostanoic acid,
9β,11α,dihydroxy-15-oxoprostanoic acid,
9α,11α,dihydroxy-15-oxoprosta-trans-13-enoic acid,
9β,11α,dihydroxy-15-oxoprosta-trans-13-enoic acid,
9α,11α,dihydroxy-15-oxoprosta-cis-5,trans-13-dienoic acid,
9β,11α,dihydroxy-15-oxoprosta-cis-5,trans-13-dienoic acid,
9α,11α,dihydroxy-15-oxoprosta-cis-5,trans-13,cis-17-trienoic acid, and
9β,11α,dihydroxy-15-oxoprosta-cis-5,trans-13,cis-17-trienoic acid, respectively, each of which products is isolated and purified as described for the isolation and purification of 11α-hydroxy-9,15-dioxoprosta-trans-13-enoic acid.

The same C-15 enzymatic oxidation procedure was used to oxidize 15-hydroxy-9-oxoprosta-10-enoic acid, 15-hydroxy-9-oxo-prosta-10,trans-13-dienoic acid, 15-hydroxy-9-oxoprosta-cis-5,10,trans-13-trienoic acid, and 15-hydroxy-9-oxoprosta-cis-5,10,trans-13,cis-17-tetraenoic acid, thereby producing the formula VI compounds 9,15-dioxoprosta-10-enoic acid, 9,15-dioxoprosta-10,trans-13-dienoic acid, 9,15-dioxoprosta-cis-5,10,trans-13-trienoic acid, and 9,15-dioxoprosta-cis-5,10,trans-13,cis-17-tetraenoic acid, respectively, each of which products is isolated and purified as described for the isolation and purification of 11α-hydroxy-9,15-dioxoprosta-trans-13-enoic acid.

Although formula IIA, formula V, and formula VI compounds wherein R₁ is hydrocarbyl or a pharmacologically acceptable cation can be prepared by the above-described C-15 enzymatic oxidation, it is preferred to prepare these esters and salts, as well as formula IIA and V compounds wherein R₃ and/or R₂ is carboxyacyl from the corresponding formula IIA, V, or VI compound wherein R₁, R₂ and/or R₃ are hydrogen, by the esterification, carboxyacylation, and salt formation procedures described above for formula II, III, and IV compounds.

The above described C-15 oxidation to produce formula IIA, V, or VI compounds is also carried out chemically in all cases wherein X in those formulas is trans-CH=CH—.

In those instances, the C-15 hydroxyl group in the reactant is an allylic alcohol, and can be oxidized to a C-15 keto with known mild oxidizing agents which will not alter the other hydroxyl groups of the desired formula IIA or formula V compounds or any of the carbon-carbon double bonds of those compounds or of the desired formula VI compounds. An example of such mild oxidizing agent is the manganese dioxide whose use for this oxidation to produce certain of the formula IIA compounds is described above. Other such mild oxidizing agents are 2,3-dichloro-5,6-dicyano-1,4-benzoquinone and the nickel peroxide described by Nakagawa et al., J. Org. Chem., 27, 1597 (1962). Still other such oxidizing agents will be known to those skilled in the art.

Following the oxidation procedure of example 1, above, PGE₂, PGE₃, PGF₁α, PGF₁β, PGF₂α, PGF₂β, PGF₂β, 15-hydroxy-9-oxoprosta-10,trans-13-dienoic acid, 15-hydroxy-9-oxoprosta-cis-5,10-trans-13-trienoic acid, and 15-hydroxy-9-oxoprosta-cis-5,10,trans-13,cis-17-tetraenoic acid are each oxidized to the corresponding 15-oxo compound, each being isolated and purified as described in that example. Hydrocarbyl esters, for example the methyl ester, of each of the above-mentioned 15-hydroxy compounds are also oxidized to the corresponding 15-oxo hydrocarbyl esters.

I claim:
1. A compound of the formula:

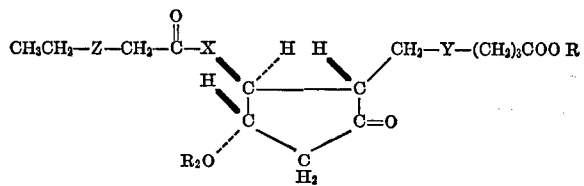

wherein X, Y, and Z are —$CH_2CH_2$—, wherein X is —$CH_2CH_2$—, Y is cis-CH=CH, and Z is —$CH_2CH_2$— or cis-CH=CH—, wherein X is trans-CH=CH—, and Y and Z are —$CH_2CH_2$—, or wherein X is trans-CH=CH—, Y is cis-CH=CH—, and Z is —$CH_2CH_2$— or cis-CH=CH—, wherein R₁ is hydrogen, lower alkyl, or a pharmacologically acceptable cation, and wherein R₂ is hydrogen or lower alkanoyl.

2. A compound according to claim 1 wherein X, Y, and Z are —$CH_2CH_2$—, and R₁ and R₂ are hydrogen.

3. A compound according to claim 1 wherein X is trans-CH=CH—, Y and Z are —$CH_2CH_2$—, and R₁ and R₂ are hydrogen.

4. A compound according to claim 1 wherein X and Z are —$CH_2CH_2$—, Y is cis-CH=CH—, and R₁ and R₂ are hydrogen.

5. A compound according to claim 1 wherein X is —$CH_2CH_2$—, Y and Z are cis-CH=CH—, and R₁ and R₂ are hydrogen.

6. A compound according to claim 1 wherein X is trans-CH=CH—, Y is cis-CH=CH—, Z is —CH$_2$CH$_2$—, and R$_1$ and R$_2$ are hydrogen.

7. A compound according to claim 1 wherein X is trans-CH=CH—, Y and Z are cis-CH=CH—, and R$_1$ and R$_2$ are hydrogen.

8. A compound of the formula:

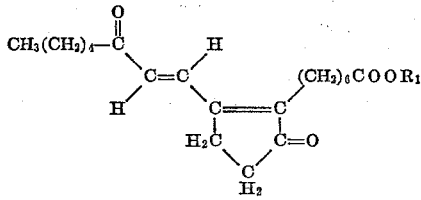

wherein R$_1$ is hydrogen, lower alkyl, or a pharmacologically acceptable cation.

9. A compound according to claim 8 wherein R$_1$ is hydrogen.

10. A compound of the formula:

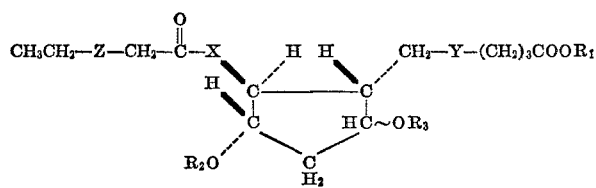

wherein X, Y, and Z are —CH$_2$CH$_2$—, wherein X is trans-CH=CH—, and Y and Z are —CH$_2$CH$_2$—, or wherein X is trans-CH=CH—, Y is cis-CH=CH—, and Z is —CH$_2$CH$_2$— or cis-CH=CH—, wherein R$_1$ is hydrogen, lower alkyl, or a pharmacologically acceptable cation, wherein ~ is a generic expression denoting an alpha or a beta configuration for the OR$_3$ moiety, and wherein R$_2$ and R$_3$ are hydrogen or lower alkanoyl, with the proviso that if R$_3$ is lower alkanoyl, R$_2$ is also lower alkanoyl.

11. A compound according to claim 10 wherein X, Y, and Z are —CH$_2$CH$_2$—, and R$_1$, R$_2$, and R$_3$ are hydrogen.

12. A compound according to claim 10 wherein X is trans-CH=CH—, Y and Z are —CH$_2$CH$_2$—, and R$_1$, R$_2$, and R$_3$ are hydrogen.

13. A compound according to claim 10 wherein X is trans-CH=CH—, Y is cis-CH=CH—, Z is —CH$_2$CH$_2$—, and R$_1$, R$_2$, and R$_3$ are hydrogen.

14. A compound according to claim 10 wherein X is trans-CH=CH—, Y and Z are cis-CH=CH—, and R$_1$, R$_2$, and R$_3$ are hydrogen.

15. A compound of the formula:

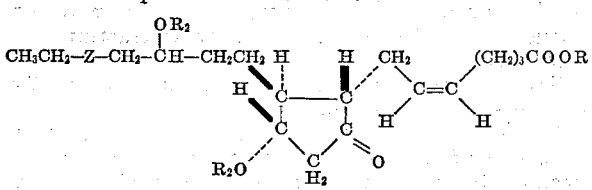

wherein Z is —CH$_2$CH$_2$— or cis-CH=CH—, wherein R$_1$ is hydrogen, lower alkyl, or a pharmacologically acceptable cation, and wherein R$_2$ is hydrogen or lower alkanoyl.

16. A compound according to claim 15 wherein Z is —CH$_2$CH$_2$—, and R$_1$ and R$_2$ are hydrogen.

17. A compound according to claim 15 wherein Z is cis-CH=CH—, and R$_1$ and R$_2$ are hydrogen.

18. 9,15 - Dioxoprosta-10,trans-13-dienoic acid, and the lower alkyl esters and pharmacologically acceptable salts thereof.

19. The carboxylic acid of claim 18.

20. 9,15 - Dioxoprosta - cis-5,10,trans-13-trienoic acid, and the lower alkyl esters and pharmacologically acceptable salts thereof.

21. The carboxylic acid of claim 20.

22. 9,15 - Dioxoprosta-cis-5,10,trans-13,cis-17-tetraenoic acid, and the lower alkyl esters and pharmacologically acceptable salts thereof.

23. The carboxylic acid of claim 22.

References Cited

Pike, J. E. et al.: Nobel Symposium #2, Prostaglandins, Stockholm, June 1966.

Ramwell, P. W. et al.: Prostaglandins (chapt. 7), in Progress in The Chemistry of Fats and Other Liquids, 1969.

Acta Chem. Scandinavica, 16 (1962), 501–502.

Sixth International Congress of Biochem., July 1964, Abstracts VII.

JACS, 85, 1878 (1963).

Angewandte Chemie (International Edit.), vol. 4, May 1965.

LORRAINE A. WEINBERGER, Primary Examiner

P. J. KILLOS, Assistant Examiner

U.S. Cl. X.R.

260—211 R, 247.2 B, 268, 293.65, 295, 326.3, 347.5, 410, 429.2, 430, 439 R, 448 R, 468 D, 468 L, 468 R, 471 R, 473 G, 475 R, 476 R, 485 G, 486 R, 488 R, 501.1, 501.15, 501.17, 501.2; 424—305, 311, 317

UNITED STATES PATENT OFFICE
CERTIFICATE OF CORRECTION

Patent No. 3,836,578          Dated September 17, 1974

Inventor(s) Bengt Samuelsson

It is certified that error appears in the above-identified patent and that said Letters Patent are hereby corrected as shown below:

Column 3, line 66 "(1065)" should read --(1965)--. Column 14, line 34 "11αlhydroxy-" should read --"11α-hydroxy- --. Column 15, line 1 "hydrocabyl," should read --hydrocarbyl--; line 26 "the $OR_2$ moiety" should read --the $OR_3$ moiety--. Column 18, lines 34-35 "$PGF_2\alpha$, $PGF_2\beta$, $PGF_2\beta$, 15-hydroxy-9-" should read --$PGF_2\alpha$, $PGF_2\beta$, $PGF_3\alpha$, $PGF_3\beta$, 15-hydroxy-9- --. Column 20, Claim 15, line 4 should read

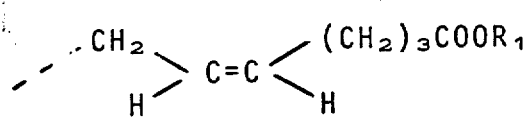

Signed and Sealed this

*Twenty-seventh* Day of *December 1977*

[SEAL]

Attest:

RUTH C. MASON        LUTRELLE F. PARKER
*Attesting Officer*     *Acting Commissioner of Patents and Trademarks*